US009838832B2

(12) United States Patent
Vasko et al.

(10) Patent No.: US 9,838,832 B2
(45) Date of Patent: Dec. 5, 2017

(54) WIRELESS COMMUNICATION DEVICE LINKING IN AN INDUSTRIAL AUTOMATION ENVIRONMENT

(71) Applicant: Rockwell Automation Technologies, Inc., Mayfield Heights, OH (US)

(72) Inventors: David A. Vasko, Hartland, WI (US); Ronald Bliss, Twinsburg, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 14/988,710

(22) Filed: Jan. 5, 2016

(65) Prior Publication Data

US 2017/0195827 A1 Jul. 6, 2017

(51) Int. Cl.
| | |
|---|---|
| H04B 5/00 | (2006.01) |
| H04W 4/00 | (2009.01) |
| H04W 8/00 | (2009.01) |
| H04W 12/08 | (2009.01) |

(52) U.S. Cl.
CPC ........... *H04W 4/008* (2013.01); *H04W 8/005* (2013.01); *H04W 12/08* (2013.01)

(58) Field of Classification Search
None
See application file for complete search history.

(56) References Cited

U.S. PATENT DOCUMENTS

| | | | | |
|---|---|---|---|---|
| 8,050,782 B2* | 11/2011 | Fallman | ............... | G05B 19/409 700/245 |
| 8,594,573 B2* | 11/2013 | Miettinen | ............ | A61B 5/0006 370/478 |
| 9,055,388 B2* | 6/2015 | Lee | ........................ | H04W 8/005 |
| 2007/0123165 A1* | 5/2007 | Sheynman | .......... | H04M 1/7253 455/41.2 |
| 2008/0009309 A1* | 1/2008 | Gha | ..................... | H04M 1/7253 455/550.1 |
| 2012/0137346 A1* | 5/2012 | Lee | ........................ | G06F 21/606 726/4 |
| 2014/0181521 A1* | 6/2014 | Hemphill | .............. | H04L 9/0819 713/171 |

\* cited by examiner

*Primary Examiner* — Tuan A Tran

(57) ABSTRACT

Techniques to facilitate linking a control device to a specific industrial asset in an industrial automation environment are disclosed herein. In at least one implementation, an initiating link is established between a mobile device and a target device (e.g., the target device being selected from one or more industrial assets discovered within a close-range initiating range of a proximity communication system of the mobile device). This initiating link can be established using Near Field Communications (NFC), QR code, an optical indicator, and/or other means. The initiating link enables and is used to establish a functional link between the target device and a control device. The functional link can include a larger range, higher performance networking connection. In some implementations a secondary communication device serves as proxy for the target device.

20 Claims, 5 Drawing Sheets

WIRELESS COMMUNICATION DEVICE LINKING IN AN INDUSTRIAL AUTOMATION ENVIRONMENT

TECHNICAL FIELD

Aspects of the disclosure are related to the field of wireless communication within an industrial automation environment.

TECHNICAL BACKGROUND

Mobile devices (e.g., tablets, smartphones, augmented reality devices) need to be associated with various industrial assets in an industrial environment (e.g., a factory floor). Such industrial assets can be packed very tightly; tens and sometimes hundreds of devices may be within range of a given wireless system's signals (e.g., Bluetooth and/or WiFi) in any given setting. In such situations, locating the correct device from such a vast array might not be practical or feasible (e.g., selecting a single device from a list of all available devices, which list might be a dozen pages on a tablet or smartphone, each page containing dozens of device identifications), and thus finding the correct device to associate with and communicate with can be difficult, time consuming, problematic and error prone.

OVERVIEW

Techniques to facilitate linking a control device to a specific industrial asset in an industrial automation environment are disclosed herein. In at least one implementation, an initiating link is established between a mobile device and a target device (e.g., a selected industrial asset such as a human machine interface device (HMI device)). This initiating link can be established using Near Field Communications (NFC), QR code, an optical indicator, and/or other means. The initiating link enables and is used to establish a functional link between the target device and a control device. The functional link can include a larger range, higher performance networking connection. In some implementations a secondary communication device serves as proxy for the target device.

This Overview is provided to introduce a selection of concepts in a simplified form that are further described below in the Detailed Description. It should be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

DETAILED DESCRIPTION

Figure 1:
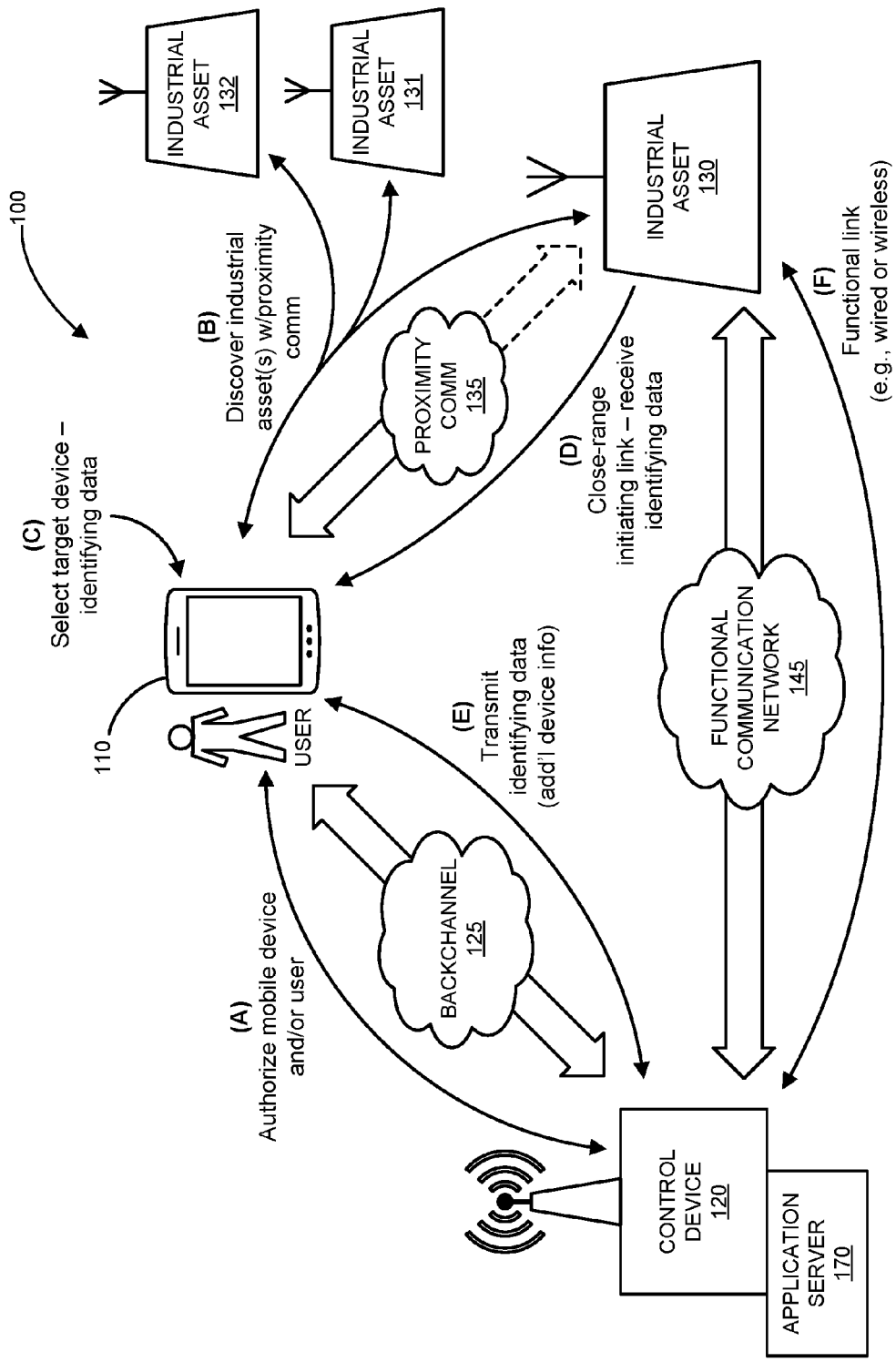
FIG. 1 is a block diagram that illustrates an operation of a communication system in an exemplary implementation.

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Implementations of wireless communication within an industrial environment disclosed and claimed herein provide apparatus and methods pertaining to linking devices for communication within an industrial environment. Various aspects of this disclosure are now described with reference to the drawings, wherein like reference numerals are used to refer to like elements throughout. In the following description, for purposes of explanation, numerous specific details are set forth in order to provide a thorough understanding of one or more aspects. It should be understood, however, that certain aspects of this disclosure may be practiced without these specific details, or with other methods, components, materials, etc. In other instances, well-known structures and devices are shown in block diagram form to facilitate describing one or more aspects.

Industrial controllers, their associated I/O devices and other industrial environment control devices are important in modem industrial automation systems. Such controllers interact with a wide variety of and large numbers of industrial assets on the plant floor to control automated processes relating to operations like product manufacture, material handling, batch processing, supervisory control, and other such applications. Generally, control devices can read input data from sensors and metering devices that provide data regarding the controlled system, and generate control outputs based on the read data in connection with a given program.

A given industrial environment can include numerous industrial assets (e.g., devices including machines performing various functions). End users (e.g., the owners of the industrial assets) and other authorized parties (e.g., OEMs (original equipment manufacturers)) occasionally need to remotely access and communicate with industrial assets safely, securely, promptly, and cost-effectively using appropriately robust wireless communication systems. However, identifying and linking to a specific industrial asset (i.e., a "target device") can be impractical when a relatively large-scale wireless communication system in an industrial environment attempts to identify, link to and communicate with a desired target device in the midst of dozens and possibly hundreds of other potential target devices that all have wireless communication capabilities.

Industrial assets are frequently located in settings for which close-range communication can be used but for which data entry and other operations are impractical (e.g., due to confined space, hazardous environmental conditions, moving industrial equipment, functional safety). Therefore, use of a close-range communications system such as NFC is often inadequate and/or otherwise undesirable for full functional communications between control devices and industrial assets with which they interact.

Also, remotely accessing industrial assets via large-scale wireless communication systems can present safety and security issues. Some implementations of linking systems and wireless communication within an industrial environment thus include steps and/or measures to protect against unauthorized access to control routines and/or proprietary data (e.g., production statistics, run schedules, network configuration and make-up, confidential input and output data). While certain examples set forth in this disclosure will be described in connection with providing the equipment owner with wireless remote access to the owner's assets, similar techniques can be used to facilitate access to other parties, including but not limited to device vendors, third-party service providers and systems integrators.

Some implementations of wireless communication within an industrial environment utilize two types of communication, first, to establish an association (an initiating link) between a mobile device and a target device (a selected industrial asset, fixed or mobile) and, second, to enable full functional wireless communication (a functional link) between the target device and a control device (the control device can be a distinct communication device using the functional link or can be the mobile device using the functional link). Each of the mobile device, target device and control device can be a single unit or can be multiple components acting otherwise in concert to perform the functions described. Implementations of this linking and wireless communication within an industrial environment establish associations (i.e., "initiating links") between target devices and control devices reliably, accurately and quickly. An initiating link is established when the target device is within an initiating range of the mobile device (e.g., the range of an NFC system utilized by the mobile device). The functional link and subsequent wireless communication between the control device and the target device can be established and maintained within a functional range (e.g., the range of a Bluetooth or WiFi system) that can be greater than the initiating range. In some implementations the functional link and subsequent wireless communications using the functional link are of a higher performance level and/or are more robust than the initiating link, thus allowing for full functional communication between the control device and target device and permitting implementation of a higher performance communication mode between the devices.

Some implementations utilize Near Field Communications (NFC) to establish the initiating link. NFC has a relatively short communication range (typically requiring communicating devices to be touching or within 10 cm of one another) and thus is less prone to excessive numbers of potential target devices responding. Alternative antenna designs can further reduce this distance. Moreover, NFC can be implemented in a smartphone, tablet or any other portable device (e.g., handheld devices, wearable devices including eyewear and headwear that utilize augmented reality).

However, the limited range of NFC and similar close-range linking processes that can be used to establish the initiating link makes data entry and ongoing target device control impractical and possibly inadvisable (e.g., due to confined spaces, moving equipment, functional safety).

Moreover, some mobile devices that can be used to establish the initiating link may be limited in their functionality (e.g., with regard to data entry, available applications, availability and suitability for long-term communications).

Linking a target device and a mobile device using a proximity communication system prior to establishing full functional wireless communication between the target device and a control device may achieve the technical effect of reducing errors caused and time required in finding a specific industrial asset and establishing full functional wireless communication between that device and another device. These improvements could in turn enhance installation, panel building, ring out, debugging and production optimization in an industrial automation environment. In some implementations security can similarly be improved.

Figure 2:
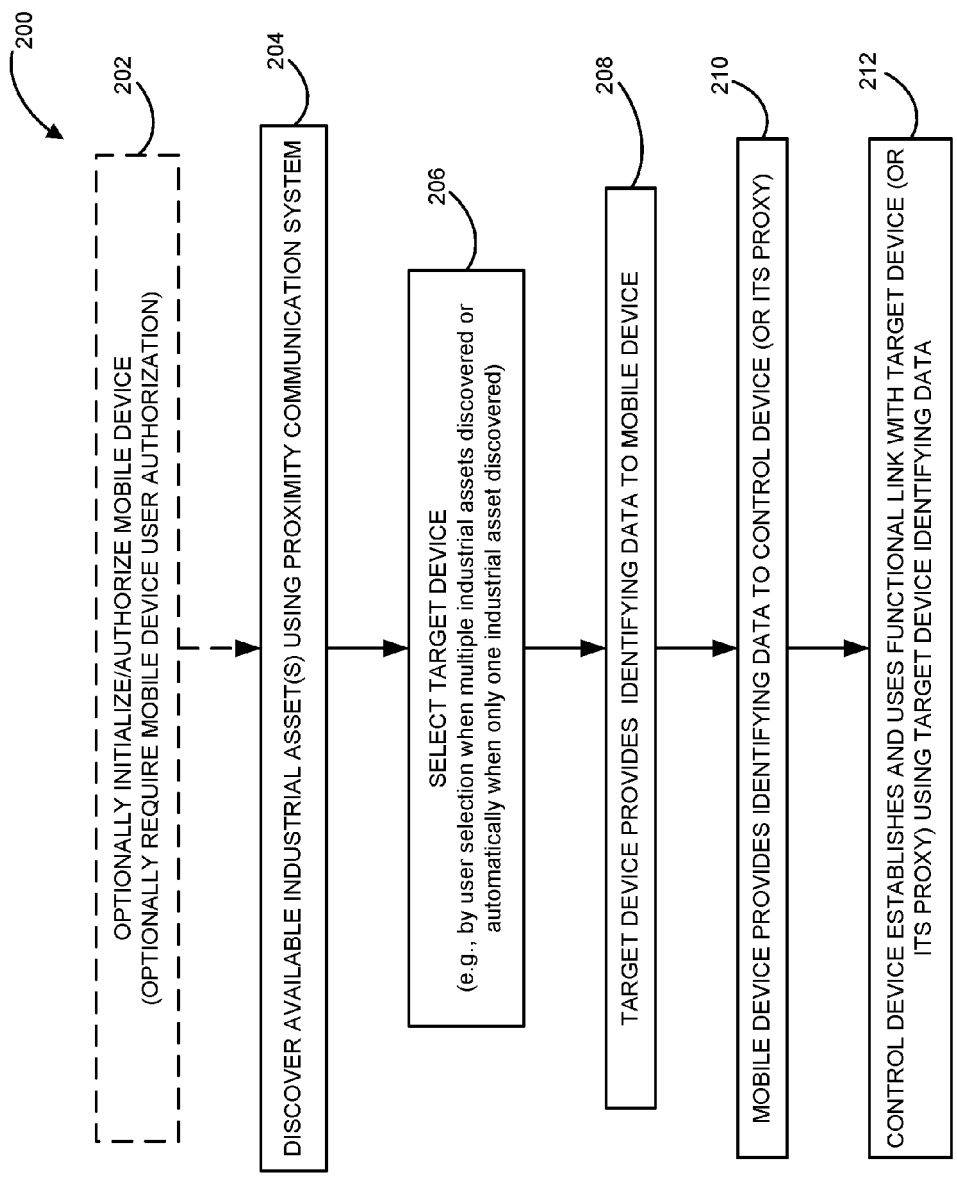
FIG. 2 is a flow diagram that illustrates an operation of a computing system in an exemplary implementation.
Figure 3:
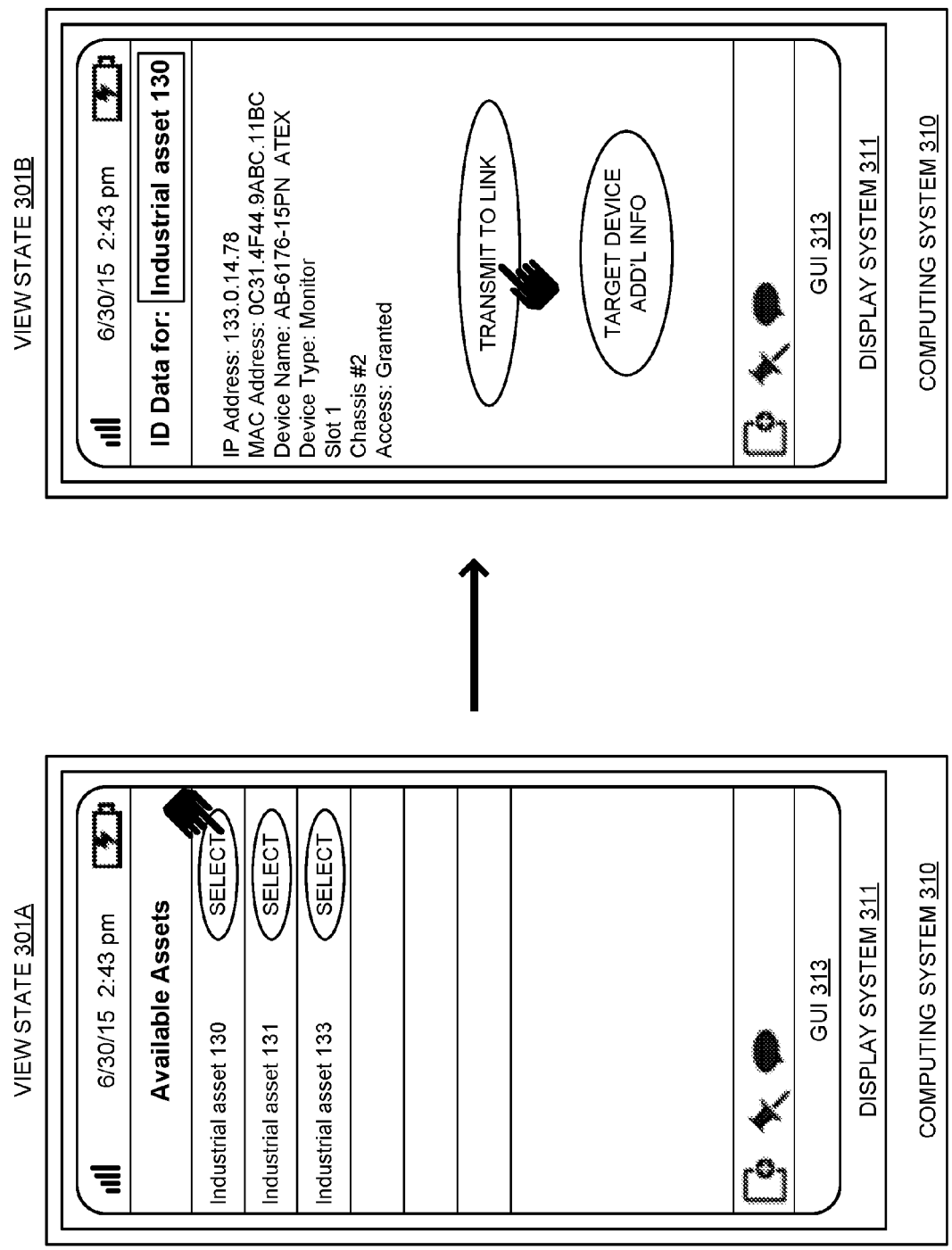
FIG. 3 is a block diagram that illustrates an operational scenario of a computing system in an exemplary implementation.
Figure 4A:
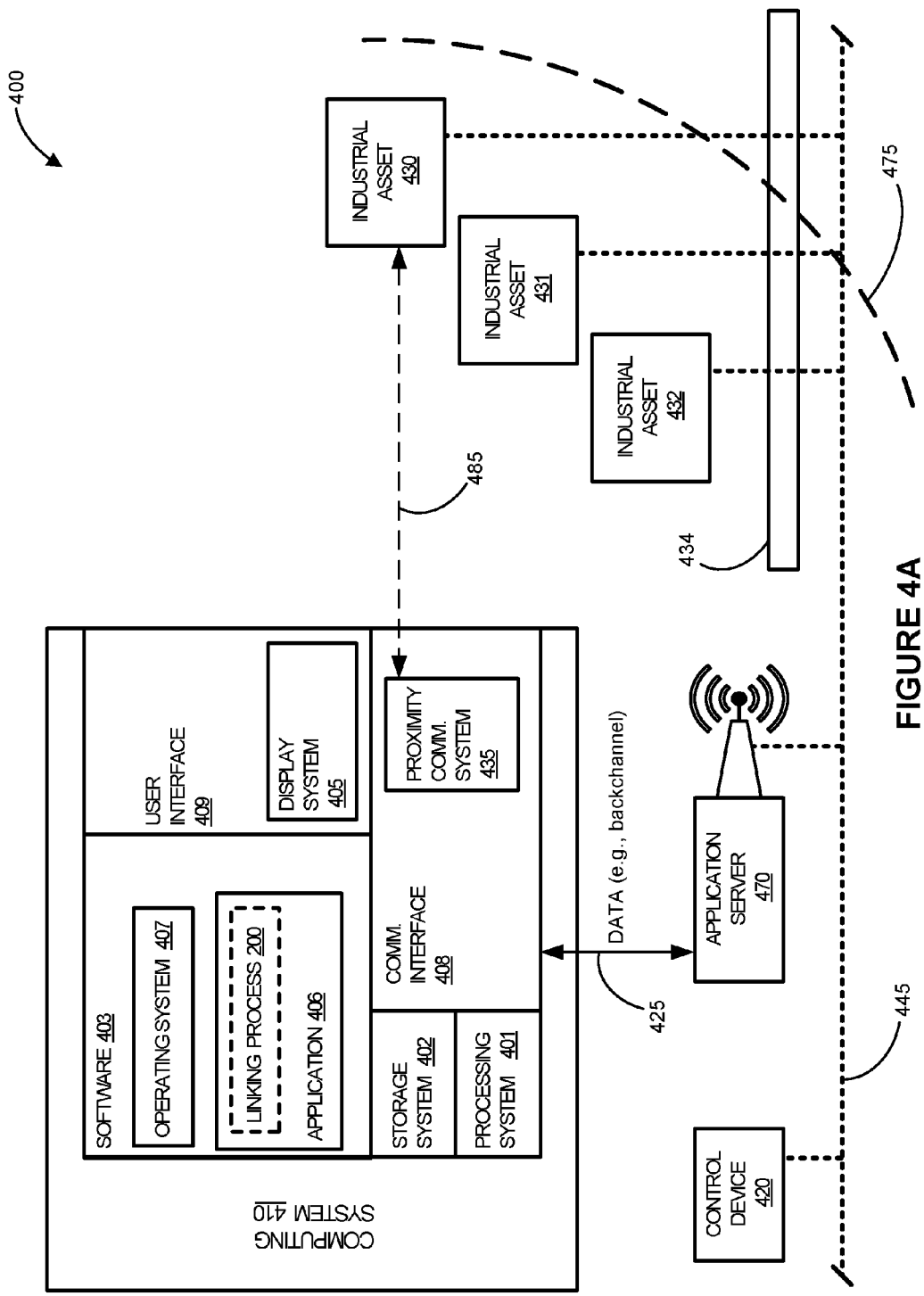
FIG. 4A is a block diagram that illustrates an operational scenario involving a computing system in an industrial automation environment in an exemplary implementation.
Figure 4B:
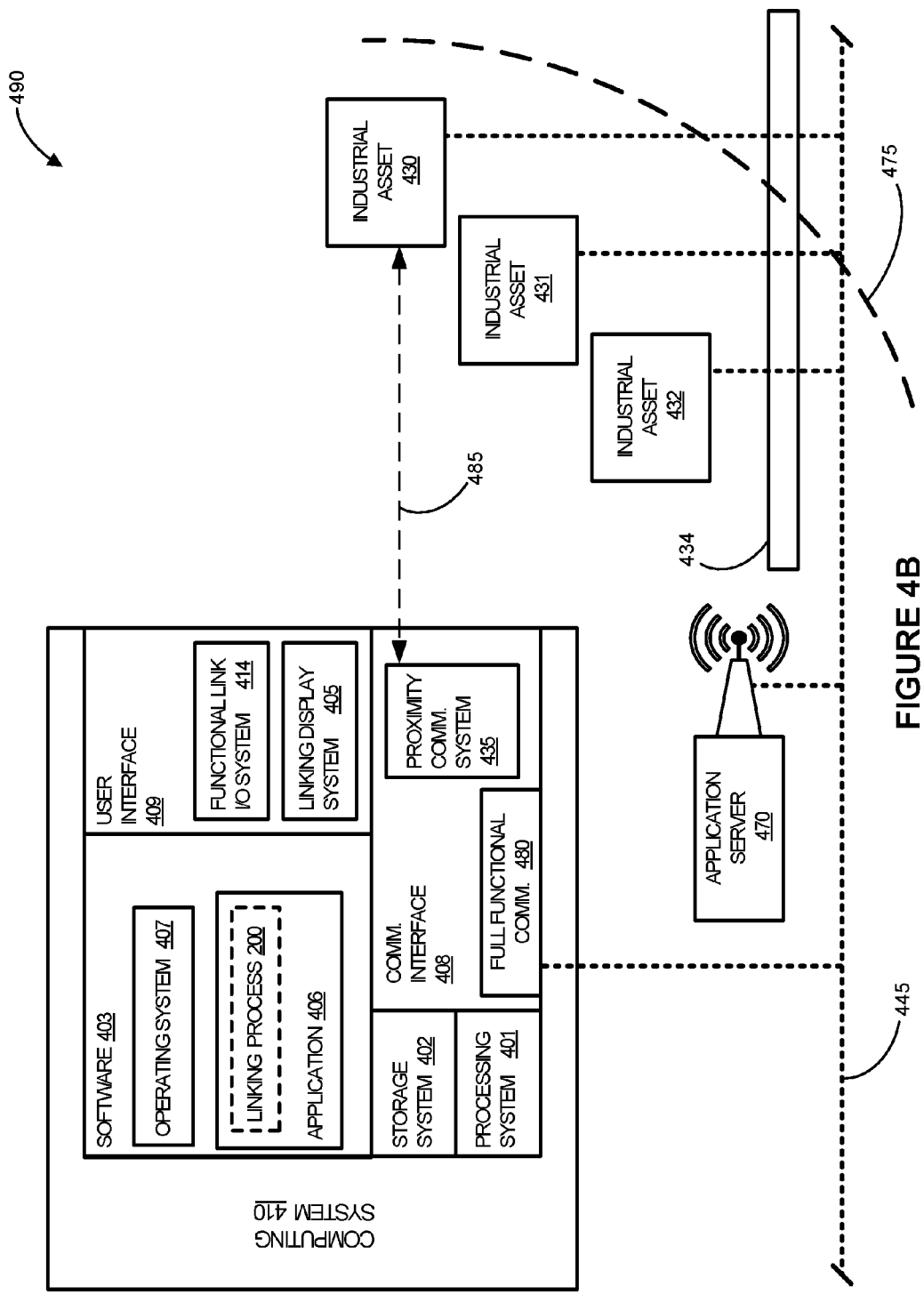
FIG. 4B is a block diagram that illustrates an operational scenario involving a computing system in an industrial automation environment in an exemplary implementation.

Referring now to the drawing, FIG. 1 illustrates a communication system and an operational scenario in which a computing system facilitates linking target device to a control device. FIG. 2 illustrates a wireless linking process that may be performed by a computing system. FIG. 3 illustrates an operational scenario involving a computing system in an exemplary implementation that facilitates linking a target device to a control device in a wireless communication system. FIGS. 4A and 4B illustrate exemplary industrial automation environments, each of which includes a computing system that may be used to execute a linking process and to perform any of the linking processes and operational scenarios described herein.

Turning now to FIG. 1, an operational scenario of device linking in a wireless communication system 100 is illustrated in an exemplary implementation. System 100 implements wireless communication within an industrial environment using a mobile device initiator 110 that facilitates establishing a functional link between an industrial asset (e.g., industrial asset 130 of FIG. 1) and a control device (e.g., control device 120 of FIG. 1) and can be used to authorize wireless communications with such industrial assets.

An exemplary operation of system 100 is illustrated in FIG. 1, the order of which is designated by the reference letters (A) through (F), but note that the steps could be performed in any order for any operation described herein. A communication network in some examples could comprise an on-premise private network or private cloud accessible over a local network connection, a public cloud-based environment accessible over a wide area network such as the Internet, or any other deployment scheme, including combinations thereof. A mobile device 110 functions as an initiator and can be any of the devices noted herein.

In many industrial environments, security is a critical concern and access to various information, control and other systems is limited to those individuals whose responsibilities require such access. Likewise access is limited to only those devices appropriate for carrying out such responsibilities. Thus, in some implementations of device linking in a wireless communication system within an industrial environment, mobile device 110 of system 100 must first be authorized to access industrial assets and a control device (and/or application server) in a given facility, which can be achieved via a clearance, handshake and/or other process (step (A)) seen in FIG. 1.

During such initialization and/or authorization, mobile device identifying information and other data can be exchanged between mobile device 110 and an application server 170 that manages wireless communication within the relevant industrial environment. In some implementations both the mobile device and its user must be granted wireless communication access within an industrial environment. Mobile device 110 can engage in the authorization procedure via a control device 120 connected to application server 170 using a wireless communication backchannel 125 that can be part of a single industrial environment communication system or can be a separate system. Other authorization and/or initialization systems and processes can likewise be used.

Once mobile device 110 and its user have received any required authorization, mobile device 110 can be used to discover and initiate communication linking with regard to a selected industrial asset in system 100. Using a proximity communication system 135, mobile device 110 discovers (step (B)) one or more industrial assets 130, 131, 132 within the operating range (the "initiating range") of the proximity communication system 135. The desired target device is selected (step (C)) from the discovered industrial asset(s) using mobile device 110. In FIG. 1 industrial asset 130 is selected as the target device from the discovered industrial assets 130, 131, 132. A target device may be selected automatically by mobile device 110 in some implementations when only one industrial asset is discovered using the proximity communication system 135.

A close-range initiating link is established using proximity communication system 135 (e.g., Near Field Communications, optical reading, audio/sound detection, QR codes). Although the close-range initiating link can use a proximity communication system that greatly reduces the number of discovered potential target devices from which a selection is made, there may nevertheless be multiple devices from which a selection must be made. Other close-range initiating linking could be used based on a system other than NFC where the alternative likewise employs the same "proximity" control as NFC (e.g., a sub-audible sound channel, audible sound channel, inaudible sound channel, a visible light-based channel, an invisible light-based channel, proximity card system, optical indicator, QR code).

The initiating link can be used to establish an association in one or more ways, for example by having the target device provide target device identifying data (e.g., target device name, IP address, alias, MAC address, network location or address) to the mobile device. In some instances the mobile device and any target device(s) may engage in two-way communications; in other implementations the mobile device only discovers appropriate industrial assets and receives target device identifying data from one or more selected target devices using the close-range initiating link.

Mobile device 110 then receives identifying data (step (D)) for the target device (i.e., the selected industrial asset 130). If the mobile device user wants additional information about the selected target device, the user may optionally access such supplemental information from either the target device itself and/or from the application server 170 or other network source.

The identifying data for the target device is then transmitted (step (E)) by mobile device 110 to the control device 120 and/or application server 170 using backchannel 125. The functional link may then be established (step (F)) between the control device 120 and the target device 130 using a full functional communication network 145 (which can be wireless, wired or a combination thereof) that permits full functional link interaction between the control device 120 and target device 130. Establishment of the full functional link can include verification of the target device identifying data and other steps to ensure secure communications and prior clearance of the functional link communications between the control device and target device.

FIG. 2 is a flow diagram that illustrates a device linking operation 200 of a wireless communication system in an exemplary implementation. Linking operation 200 shown in FIG. 2 enables (and, in some implementations, authorizes) the selective functional engagement of a control device with a target device. The steps of the operation are indicated below parenthetically. The following discussion of operation 200 will proceed with reference to communication system 100 of FIG. 1 in order to illustrate its operations, but note that the details provided in FIG. 1 are merely exemplary and not intended to limit the scope of process 200 to the specific implementation shown in FIG. 1.

Mobile device 110 is optionally initialized and/or authorized (202) by a communication system such as a wireless local area network (WLAN). This initialization/authorization step can include both the mobile device 110 itself and any individual using the mobile device to establish wireless communication within an industrial environment. Available industrial assets 130, 131, 132 are discovered (204) within the initiating range of the proximity communication system 135 used by the mobile device 110 for establishing the initiating link. In some instances this range may be a distance measured in centimeters or may require touching the mobile device 110 to one or more devices including the target device 130. When one or more industrial assets 130, 131, 132 are discovered, a single industrial asset 130 is selected as the target device (206), for example being clicked on or otherwise designated on a screen or other interface of the mobile device 110. A target device may be selected automatically by mobile device 110 in some implementations when only one industrial asset is discovered using the proximity communication system 135.

The target device provides identifying data (208) to the mobile device 110, for example by transmitting the identifying data via an initiating link established by the proximity communication system 135. The proximity communication system 135 may allow for two-way communication between the mobile device 110 and the selected target device 130 using the initiating link, or the proximity communication system 135 may be limited to a receive-only mode once the target device 130 is selected. This identifying data and any other identifying or authorizing data is then sent (210) by the mobile device 110 to the control device 120 (or its communication proxy such as an application server 170). The control device 120 uses the identifying data to establish a functional link (212) between the control device 120 and the target device 130 using communication network 145. The functional link permits full communication between the control device 120 and target device 130 (e.g., enabling control, data collection, operational amendment regarding the target device, etc.) and can be an environment-wide wired or wireless communication system, a combination thereof, or the like (e.g., WiFi).

The mobile device used in connection with implementations of wireless communication within an industrial environment can be a smartphone, tablet or any other portable device (e.g., cell phones, laptop computers, notebook computers, handheld devices, wearable devices including eyewear, smart watches and headwear that utilize augmented reality) that allows a user to get the mobile device within the proximity communication system's initiating range. The mobile device can be configured with the proximity communication system using hardware, software, firmware or a combination of the same. Moreover, the mobile device can be configured with a software application installed on the mobile device, which enables the mobile device and its user to be initialized with and/or authorized by any control device, application server and related systems.

FIG. 3 is a block diagram that illustrates an operational scenario of computing system 310, which can be part of a linking-capable mobile device in exemplary implementations. Computing system 310 includes display system 311 which displays a graphical user interface (GUI) 313. In this example, display system 311 comprises a touchscreen that displays GUI 313 for the user to interact with and accepts input commands from the user via the user's touches on the surface of the touchscreen. In FIG. 3, two different view states are shown displayed on display system 311, labeled 301A and 301B. The different view states show the changes that occur to GUI 313 as the user makes selections and interacts with GUI 313 in establishing and exploiting an initiating link.

In view state 301A, the user is presented with available industrial assets (e.g., industrial assets 130, 131, 132 from FIG. 1) that have been discovered within the initiating range of a proximity communication system implemented by computing system 310. The asset list can be generated in response to a prompt from the user or can be periodically updated as the computing system 310 is moved within an industrial environment. In view state 301A the available asset list allows the user to select one or more of the available industrial assets (e.g., industrial assets 130, 131, 132 of FIG. 1) to establish an initiating link. In view state 301A the user selects industrial asset 130, the selected industrial asset also being referred to as the target device.

After selection of the target device 130 in FIG. 3 (i.e., the desired industrial asset), computing system 310 can receive identifying data from target device 130. As seen in the non-limiting example view state 301B of FIG. 3, such target device identifying data can include the selected device's IP address, MAC address, device name, device type and access status. If the user wants to enable a functional link between the selected target device and the control device, the user can transmit the identifying data (and/or other data that can be used to establish the functional link) to the control device, for example via a communication network backchannel like backchannel 125 of FIG. 1. Moreover, if the user wants to obtain and/or verify additional information about the target device, the user can request additional information from either the target device and/or the control device (and/or its associated application server).

FIG. 4A is a block diagram that illustrates an industrial automation environment 400 in an exemplary implementation. Industrial automation environment 400 provides an exemplary environment in which to implement the wireless communication linking systems and processes disclosed herein, but other environments could also be used. Industrial automation environment 400 includes computing system 410, industrial assets 430, 431, 432, network 445 (e.g., the network can be wired, wireless or a combination thereof), application server 470 and control device 420. Note that there would typically be many more industrial assets in most industrial automation environments, but the number of industrial assets shown in FIG. 4A has been restricted for clarity in this non-limiting example.

Industrial automation environment 400 comprises an automobile manufacturing factory, food processing plant, oil drilling operation, microprocessor fabrication facility, or some other type of industrial enterprise. Industrial assets 430, 431, 432 could comprise sensors, drives, pumps, filters, drills, motors, robots, fabrication machinery, mills, printers, or any other industrial automation equipment, including their associated control systems (e.g., automation controllers, programmable logic controllers (PLCs), programmable automation controllers (PACs), or any other controllers used in automation control). Additionally, industrial assets 430, 431, 432 could comprise other industrial equipment, such as brew kettles in a brewery, reserves of coal or other resources, or other elements that may reside in an industrial automation environment 400.

Each industrial asset can be detected using a close-range discovery protocol or system, such as proximity communication system 435 (e.g., an NFC system) in which a detecting device (i.e., computing system 410) is able to detect industrial assets within a specified detection (initiating) range 475. That initiating range is not more than ~10 cm in some implementations. Communication between computing system 410 and industrial assets 430, 431, 432 using proximity communication system 435 is achieved with initiating links such as the link 485 shown between computing system 410 and industrial asset 430. Each industrial asset can be identified in one or more ways, for example by using identifying data supplied by the discovered industrial asset.

Computing system 410 is also able to communicate with a control device 420 via network 445 (e.g., through a server 470 or other communication device that coordinates communications on communication network 445). Network 445 permits full functional communication between devices communicating over network 445. Control device 420 can include desktop computers, laptop computers, server computers, and virtual machines, as well as any other type of computing system, variation, or combination thereof In industrial environment 400 industrial assets 430, 431, 432 are able to communicate with control device 420 and the like using network 445. In some examples server 470 controls network 445 and/or communication between such network elements directly. In other examples various industrial assets might utilize a secondary communication device 434 (e.g., a router, gateway, telecommunication switch, server, processing system, or other communication equipment) as proxy for the industrial assets coupled to the secondary communication device 434. Network 445 can include multiple servers, multiple control devices, multiple secondary devices and numerous industrial assets and the configuration illustrated in FIG. 4A is provided as a non-limiting example of an implementation.

The communication links over which data is exchanged between various components of environment 400 can comprise multiple network elements such as routers, gateways, telecommunication switches, servers, processing systems, or other communication equipment and systems for providing communication and data services. These communication links could use various communication protocols, such as TDM, IP, Ethernet, telephony, optical networking, packet networks, wireless mesh networks (WMN), local area networks (LAN), metropolitan area networks (MAN), wide area networks (WAN), hybrid fiber coax (HFC), communication signaling, wireless protocols, communication signaling, peer-to-peer networking over Bluetooth, Bluetooth low energy, Wi-Fi Direct, near field communication (NFC), or some other communication format, including combinations thereof. The communication links could be direct links or may include intermediate networks, systems, or devices.

Computing system 410 may be representative of any portable computing apparatus, system, or systems on which the wireless communication linking processes disclosed herein or variations thereof may be suitably implemented. Examples of computing system 410 include mobile computing devices, such as cell phones, smartphones, tablet computers, laptop computers, notebook computers, handheld computers, wearable computer devices, and gaming devices, as well as any other type of mobile computing devices and any combination or variation thereof. In some implementations, computing system 410 can comprise a mobile device capable of operating in a server-like fashion which, among other uses, could be utilized in a wireless mesh network.

Computing system 410 includes processing system 401, storage system 402, software 403, communication interface 408, and user interface 409. Processing system 401 is operatively coupled with storage system 402, communication interface 408, and user interface 409. Processing system 401 loads and executes software 403 from storage system 402. Software 403 includes one or more applications 406 and operating system 407. Applications 406 may include linking process 200 in some examples. When executed by computing system 410 in general, and processing system 401 in particular, software 403 directs computing system 410 to operate as described herein for linking process 200 or variations thereof. In this example, user interface 409 includes display system 405, which itself may be part of a touch screen that also accepts user inputs via touches on its surface. Computing system 410 may optionally include additional devices, features, or functionalities not discussed here for purposes of brevity. Communication interface 408 includes proximity communication system 435, which can be an NFC system, QR code system, optical signal system, audio signal system or another close-range communication system suitable for linking process 200 or variations thereof.

Referring still to FIG. 4A, processing system 401 may comprise a microprocessor and other circuitry that retrieves and executes software 403 from storage system 402. Processing system 401 may be implemented within a single processing device but may also be distributed across multiple processing devices or sub-systems that cooperate in executing program instructions. Examples of processing system 401 include general purpose central processing units, application specific processors, and logic devices, as well as any other type of processing device, combinations, or variations thereof.

Storage system 402 may comprise any computer readable media or storage media readable by processing system 401 and capable of storing software 403. Storage system 402 may include volatile and nonvolatile, removable and non-removable media implemented in any method or technology for storage of information, such as computer readable instructions, data structures, program modules, or other data. Storage system 402 may be implemented as a single storage device but may also be implemented across multiple storage devices or sub-systems co-located or distributed relative to each other. Storage system 402 may comprise additional elements, such as a controller, capable of communicating with processing system 401. Examples of storage media include random access memory, read only memory, magnetic disks, optical disks, flash memory, virtual memory and non-virtual memory, magnetic cassettes, magnetic tape, magnetic disk storage or other magnetic storage devices, or any other medium which can be used to store the desired information and that may be accessed by an instruction execution system, as well as any combination or variation thereof, or any other type of storage media. In no case is the storage media a propagated signal.

In operation, in conjunction with user interface 409, processing system 401 loads and executes portions of software 403, such as linking process 200, to render a graphical user interface for application 406 for display by display system 405 of user interface 409. Software 403 may be implemented in program instructions and among other functions may, when executed by computing system 410 in general or processing system 401 in particular, direct computing system 410 or processing system 401 to display one or more linking status and/or function screens associated with one or more industrial assets of an industrial automation environment on display system 405 of computing system 410. In addition, software 403 directs computing system 410 or processing system 401 to receive a user request to select one or more discovered industrial assets, to transmit identifying data for a selected industrial asset to a control device, and/or to request additional information about a selected industrial asset. Finally, software 403 may direct computing system 410 or processing system 401 to transfer received identifying data and/or other data from the mobile device to a full functional network server, wherein the server processes the user request to establish a full functional link between the control device and a target device.

Software 403 may include additional processes, programs, or components, such as operating system software or other application software. Examples of operating systems include Windows®, iOS®, and Android®, as well as any other suitable operating system. Software 403 may also comprise firmware or some other form of machine-readable processing instructions executable by processing system 401.

In general, software 403 may, when loaded into processing system 401 and executed, transform computing system 410 overall from a general-purpose computing system into a special-purpose computing system customized to facilitate linking target devices in an industrial automation environment to one or more control devices as described herein for each implementation. For example, encoding software 403 on storage system 402 may transform the physical structure of storage system 402. The specific transformation of the physical structure may depend on various factors in different implementations of this description. Examples of such factors may include, but are not limited to the technology used to implement the storage media of storage system 402 and whether the computer-readable storage media are characterized as primary or secondary storage.

In some examples, if the computer-readable storage media are implemented as semiconductor-based memory, software 403 may transform the physical state of the semiconductor memory when the program is encoded therein. For example, software 403 may transform the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate this discussion.

It should be understood that computing system 410 is generally intended to represent a computing system with which software 403 is deployed and executed in order to implement application 406 and/or linking process 200 (and variations thereof). However, computing system 410 may also represent any computing system on which software 403 may be staged and from where software 403 may be distributed, transported, downloaded, or otherwise provided to yet another computing system for deployment and execution, or yet additional distribution. For example, computing system 410 could be configured to deploy software 403 over the internet to one or more client computing systems for execution thereon, such as in a cloud-based deployment scenario.

Communication interface 408 may include communication connections and devices that allow for communication between computing system 410 and other computing systems (not shown) or services, over a communication network 445 or collection of networks. In some implementations, communication interface 408 receives data over communication network 445, via a backchannel 425, and/or via proximity communication system 435. Examples of connections and devices that together allow for inter-system communication may include network interface cards, antennas, power amplifiers, RF circuitry, transceivers, and other communication circuitry. The aforementioned network, connections, and devices are well known and need not be discussed at length here.

User interface 409 may include a voice input device, a touch input device for receiving a gesture from a user, a motion input device for detecting non-touch gestures and other motions by a user, and other comparable input devices and associated processing elements capable of receiving user input from a user. Output devices such as display system 405, speakers, haptic devices, and other types of output devices may also be included in user interface 409. The aforementioned user input devices are well known in the art and need not be discussed at length here. User interface 409 may also include associated user interface software executable by processing system 401 in support of the various user input and output devices discussed above. Separately or in conjunction with each other and other hardware and software elements, the user interface software and devices may provide a graphical user interface, a natural user interface, or any other kind of user interface.

FIG. 4B is a block diagram that illustrates an industrial automation environment 400 in another exemplary implementation. Industrial automation environment 490 provides an exemplary environment in which to implement the wireless communication linking systems and processes disclosed herein, but other environments could also be used. Like environment 400 of FIG. 4A, industrial automation environment 490 includes computing system 410, industrial assets 430, 431, 432, network 445 and application server 470. In this implementation, the mobile device and the control device are effectively the same device, here computing system 410. This implementation allows a handheld or wearable device to discover one or more industrial assets and thereafter establish an initiating link with a target device. Identifying data obtained from the initiating linking process enables a full functional link to be established between the combined mobile/control device and the target device. The computing system 410 operates in a manner similar to that discussed in connection with FIG. 4A. However, after identifying data is received from target device 430, it is used to allow a full functional communication system 480 to then establish a functional link to the target device 430 via full functional network 445. While the linking display system 405 might include a touchscreen to permit easy data selections and the like, functional link I/O system 414 is configured to permit full data entry and other full functional communication operations.

The functional block diagrams, operational sequences, and flow diagrams provided in the Figures are representative of exemplary architectures, environments, and methodologies for performing novel aspects of the disclosure. While, for purposes of simplicity of explanation, methods included herein may be in the form of a functional diagram, operational sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The above description and associated drawings teach the best mode of the invention. The following claims specify the scope of the invention. Some aspects of the best mode may not fall within the scope of the invention as specified by the claims. Also, while the preceding discussion describes embodiments employed specifically in conjunction with the monitoring and analysis of industrial processes, other applications, such as the mathematical modeling or monitoring of any man-made or naturally-existing system, may benefit from use of the concepts discussed above. Further, those skilled in the art will appreciate that the features described above can be combined in various ways to form multiple variations of the invention. As a result, the invention is not limited to the specific embodiments described above, but only by the following claims and their equivalents.

What is claimed is:

1. One or more non-transitory computer-readable storage media having program instructions stored thereon to facilitate a mobile device linking a target device to a control device in a wireless communication in an industrial automation environment, wherein the program instructions, when executed by a computing system of the mobile device, direct the computing system to at least:
   discover one or more industrial assets within an initiating range of a proximity communication system;
   if a single industrial asset is discovered within the initiating range, automatically select the single industrial asset as a target device;
   if more than one industrial assets are discovered within the initiating range; receive a user request to select one industrial asset of the more than one industrial assets as the target device;
   establish an initiating link between the mobile device and the target device;
   receive functional link data usable to establish a functional link between the target device and the control device, wherein the functional link data comprises target device identifying data; and
   provide the received functional link data to the control device to facilitate a functional link between the control device and the target device within a functional range of the control device;
   wherein the functional range of the control device is greater than the initiating range of the mobile device.

2. The one or more computer-readable storage media of claim 1 wherein the program instructions further direct the computing system to receive one of the following prior to discovering industrial assets within the proximity communication system initiating range: computing system authorization or user authorization.

3. The one or more computer-readable storage media of claim 1 wherein the functional link comprises Bluetooth or WiFi communications.

4. The one or more computer-readable storage media of claim 1 wherein the mobile device is one of the following: a smartphone, a cell phone, a laptop computer, a notebook computer, a tablet, a handheld computer device, a wearable computer device, a smart watch computer device, an augmented reality device.

5. The one or more computer-readable storage media of claim 1 wherein the proximity communication system comprises one of the following: a sub-audible sound channel, audible sound channel, inaudible sound channel, a visible light-based channel, an invisible light-based channel, a proximity card system, an optical indicator affixed to the target device, a QR code affiliated with the target device, or Near Field Communications (NFC) between the target device and the computing system.

6. The one or more computer-readable storage media of claim 1 wherein the initiating range is not more than approximately 10 cm.

7. The one or more computer-readable storage media of claim 1 wherein the program instructions further direct the computing system to receive target device supplemental information from an application server.

8. The one or more computer-readable storage media of claim 1 wherein the computing system comprises a display system configured to display discovered industrial assets within the proximity communication system initiating range.

9. A method of operating a computing system of a mobile device to facilitate linking a target device to a control device in an industrial automation environment, the method comprising:
the mobile device computing system discovering one or more industrial assets within an initiating range of a proximity communication system;
the mobile device computing system establishing an initiating link between the mobile device and the target device, wherein the target device comprises a first industrial asset selected from the discovered one or more industrial assets;
the mobile device computing system receiving functional link data usable to establish a functional link between the target device and the control device, wherein the functional link data comprises target device identifying data;
the mobile device computing system providing the received functional linking data to a full functional industrial environment communication system to facilitate the control device establishing a functional link between the target device to the control device within a functional range of the control device;
wherein the functional range of the control device is greater than the initiating range of the mobile device;
when the first industrial asset is the only industrial asset discovered, automatically selecting the first industrial asset as the target device; and
when a plurality of industrial assets is discovered, receiving a user selection of the first industrial asset from the plurality of industrial assets as the target device.

10. The method of claim 9 further comprising the computing system receiving at least one of the following prior to discovering industrial assets within the proximity communication system initiating range: computing system authorization or user authorization.

11. The method of claim 9 wherein the full functional industrial environment communication system comprises Bluetooth or WiFi communications.

12. The method of claim 9 wherein the mobile device is one of the following: a smartphone, a cell phone, a laptop computer, a notebook computer, a tablet, a handheld computer device, a wearable computer device, a smart watch computer device, an augmented reality device.

13. The method of claim 9 wherein the proximity communication system comprises one of the following: a sub-audible sound channel, audible sound channel, inaudible sound channel, a visible light-based channel, an invisible light-based channel, proximity card system, optical indicator, a QR code system, or an NFC system.

14. The method of claim 9 wherein the initiating range is not more than approximately 10 cm.

15. The method of claim 9 further comprising the computing system displaying discovered industrial assets within the proximity communication system initiating range.

16. An apparatus to facilitate linking a target device to a control device in an industrial automation environment, the apparatus comprising:
one or more non-transitory computer-readable storage media; and
program instructions stored on the one or more non-transitory computer-readable storage media that, when executed by a processing system, direct the processing system to at least:
display a graphical user interface (GUI) on a display system of a mobile device computing system, wherein the GUI includes a list of at least one industrial asset discovered within an initiating range of a proximity communication system;
receive a user request to select one displayed industrial asset as a target device if the GUI includes a plurality of industrial assets;
automatically select the displayed industrial asset as the target device if the GUI includes only a single displayed industrial asset;
receive functional link data usable to establish a functional link between the target device and the control device, wherein the functional link data comprises identifying data from the target device; and
provide the received functional link data to the control device to facilitate a wireless functional link between the control device and the target device within a functional range of the control device;
wherein the functional range of the control device is greater than the initiating range of the mobile device.

17. The apparatus of claim 16 wherein the proximity communication system comprises one of the following: a sub-audible sound channel, audible sound channel, inaudible sound channel, a visible light-based channel, an invisible light-based channel, proximity card system, optical indicator, a QR code system, or an NFC system.

18. The apparatus of claim 16 wherein the mobile device computing system is contained in one of the following: a smartphone, a cell phone, a laptop computer, a notebook computer, a tablet, a handheld computer device, a wearable computer device, a smart watch computer device, an augmented reality device.

19. The apparatus of claim 16 wherein the program instructions direct the processing system to receiving authorization prior to displaying the GUI.

20. The apparatus of claim 16 wherein the program instructions further direct the computing system to receive target device supplemental information from an application server.

* * * * *